US006680877B1

(12) United States Patent
Lienau

(10) Patent No.: US 6,680,877 B1
(45) Date of Patent: Jan. 20, 2004

(54) SOLAR NIGHT SPLITTER AND EVENT TIMER

(76) Inventor: Richard M. Lienau, HC 70, Box 19Z, Pecos, NM (US) 87552

( * ) Notice: Subject to any disclaimer, the term of this patent is extended or adjusted under 35 U.S.C. 154(b) by 0 days.

(21) Appl. No.: 10/350,521

(22) Filed: Jan. 24, 2003

(51) Int. Cl.[7] ........................ G04C 19/00; G04B 19/00; G01C 17/34

(52) U.S. Cl. ........................... 368/205; 368/10; 368/79; 368/82; 368/223; 33/269; 33/270

(58) Field of Search ............................. 368/10, 15, 76, 368/79, 82–84, 223, 239–242; 33/268–271

(56) References Cited

U.S. PATENT DOCUMENTS 4,487,511 A 12/1984 Lucarelli
4,551,027 A * 11/1985 Spruck ........................ 368/15
4,582,434 A 4/1986 Plangger et al.
4,731,767 A 3/1988 Uehara
4,782,472 A * 11/1988 Hines .......................... 368/15
4,933,920 A 6/1990 Sternberg
5,590,093 A * 12/1996 Scharstein et al. ............ 368/15
5,596,553 A * 1/1997 Kellogg ....................... 368/79
5,926,441 A * 7/1999 Zinsmeyer et al. ........... 368/10
6,229,765 B1 * 5/2001 Rabi .......................... 368/156
6,483,779 B1 * 11/2002 Teixeira ....................... 368/10

* cited by examiner

*Primary Examiner*—David Martin
*Assistant Examiner*—Michael L. Lindinger
(74) *Attorney, Agent, or Firm*—Michael W. Starkweather; Kunzler & Associates

(57) ABSTRACT

A solar counter to provide an accurate way of measuring the middle of the night or another selected fraction of the day or night. The solar counter activates an electronic event when it has finished counting down. For example, a lamp can be turned off half way through the dark part of the night. This process is extremely accurate, and adaptations of this concept can be used in the safety industry, irrigation, or in agriculture. One embodiment of this concept has a battery back-up circuit, but a substitute 50/60 Hz clock input frequency in the case of AC power loss can also be provided using an uninterruptible power supply (UPS).

19 Claims, 5 Drawing Sheets

SOLAR NIGHT SPLITTER AND EVENT TIMER

TECHNICAL FIELD

The present invention relates generally to operating electrical and/or mechanical devices based upon the more accurate solar day. More particularly, the present invention relates to controlling devices relative to the accurate rotation of the earth and the actual sunrise and sunset of the day, which is critical and essential to some safety conditions, religious institutions, irrigation, aquiculture , and other industries.

BACKGROUND

Previous multipurpose event timers have been based almost entirely on the time of day. These conventional events times include both traditional time and daylight-saving time. The assumption is made that sunrise and sunset occur daily at approximately 6:00 A.M. and 6:00 P.M. respectively. This assumption for sunrise and sunset divides a 24 hour period neatly in half but it does not reflect the reality that sunrise and sunset times vary widely.

These conventional event timers also assume that the actual solar earth rotation and the associated actual sunrise and sunset are not critical. The solar day is based on the time it takes the earth to make one complete rotation referenced to fixed stars instead of the sun. The solar period is 23 hours, 53 minutes and 4.09 seconds (23.9515 hours).

Industrial safety at night is an example of an area where a solar timer can be effectively used. Safety lighting is a world-wide multimillion dollar expense for businesses. For example, lighting needs to be provided in times of darkness or during a part of the night. It is wasteful to turn safety lights on before it is dark, and equally wasteful to leave them on when they are not needed. Since the time of day for sunrise and sunset is constantly changing every day of the year, it is difficult to approximate the actual time of day for each day to activate a safety light. Schools and business are also affected by this daily problem. If a conventional timer is used for these applications, then a person must periodically adjust the timer to ensure that the desired event occurs at the appropriate time after darkness.

Some industries and agricultural businesses time events around the rising and setting sun. It is known that fish, for example, feed very heavily at sunrise and sunset, although they are also known to feed rather continuously all day. Some commercial fisheries have learned that feeding just after sunrise and just before sunset is much more efficient in terms of maximum weight gain of fish per pound of feed. Additionally, in a zoo or similar habitat, there are certain animals which feed nocturnally. It can be burdensome for humans to have to feed such animals in the middle of the night. There is an advantage to be able to automate the feeding of such nocturnal animals without human invention.

Irrigation is another area where an accurate timer can be helpful. In some situations it is important to water crops or gardens after sunset. In arid areas, this allows the water to soak into the target area during darkness. Since the actual time of sunset varies, it is helpful to have a system that adjusts the watering time relative to sunset. An automatic self adjusting system has been difficult in the prior art because of the fixed timers that have conventionally been used.

Another problem with the prior art is that many event timers or controllers stop completely when the power fails, or they are reset to some predetermined starting time (e.g. 12:00 A.M.) after a power failure. This results in a timed or controlled event happening at the wrong time of day. For example, a safety light can come on in the daylight or before or after a work shift was completed.

Some conventional timers are computer controlled and are able to correct or reset themselves to the correct time of day after a power failure. Other timers even have elaborate UPS and battery systems to avoid computer shutdown in the event of a power loss. The problem with computer controlled or UPS timer systems is the expense and complexity. Many controllers come with extremely complicated hardware, ladder networks, interfaces, and programming systems.

It is desirable to provide a system which would provide control for electrical and mechanical devices based upon a more accurate timing system. It would also be advantageous to provide a timer which is keyed to the actual sunrise or sunset of each day.

SUMMARY OF THE INVENTION

It has been recognized that it would be advantageous to develop a solar event timer. The solar event timer includes an optical sensor to determine when daylight begins and ends. A solar counter is loaded with a number of solar units in a day. A clock is coupled to the solar counter and optical sensor, and is configured to linearly count down solar units during daylight and to county down the solar units at night at an accelerated rate. Electronic circuitry is included to trigger an event when the solar counter reaches zero.

Additional features and advantages of the invention will be set forth in the detailed description which follows, taken in conjunction with the accompanying drawings, which together illustrate by way of example, the features of the invention.

DETAILED DESCRIPTION

Figure 1:
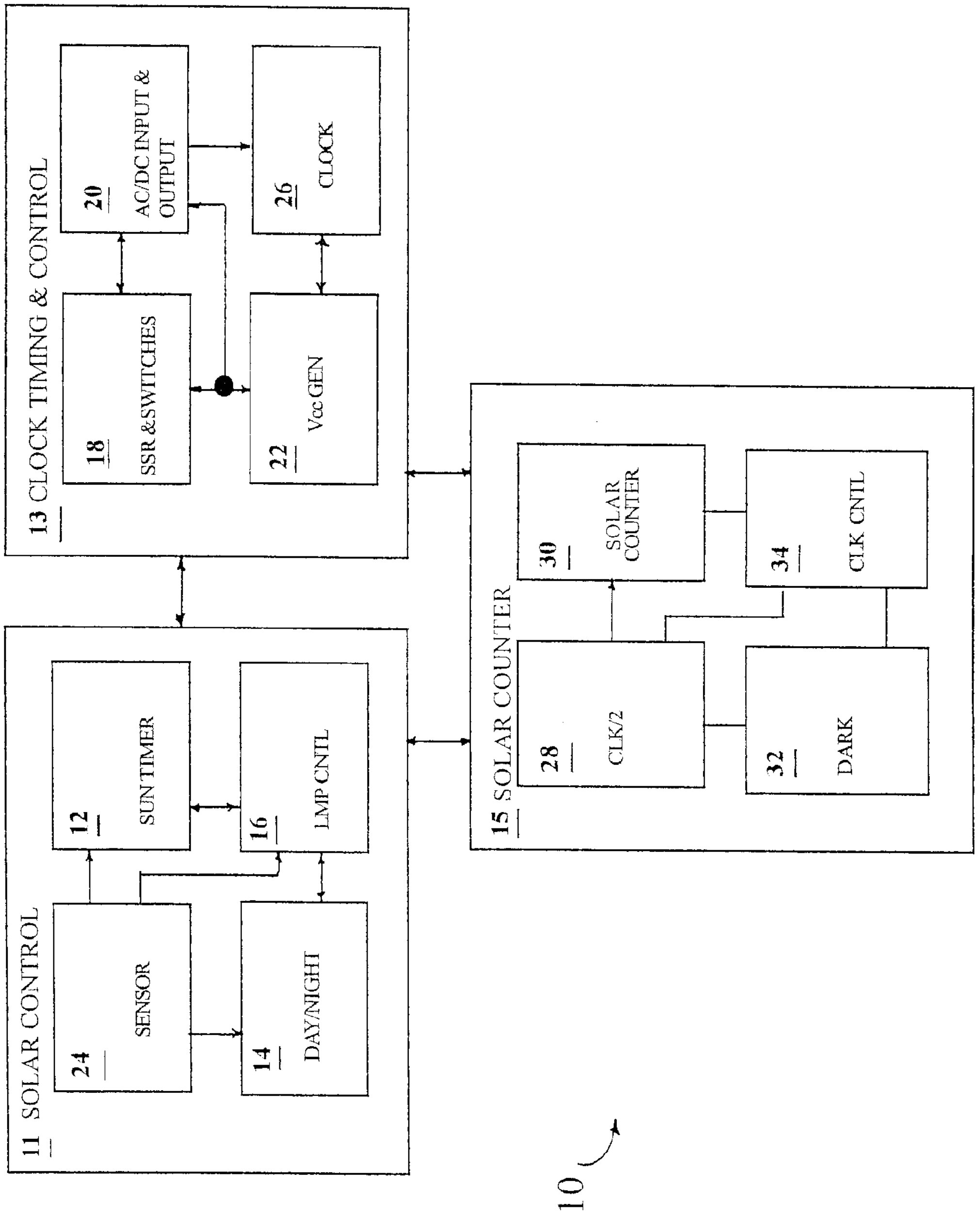
FIG. 1 is a block diagram of a preferred embodiment of a solar event timer.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention. The invention will be described with additional specificity and detail through the use of the accompanying drawings. Like numbering between figures represents like elements.

This invention uses an accurate solar counter to split the darkness or daylight time exactly into selected portions or fractions. The preferred division is to divide the night in half. The darkness time can also be split by one fourth, one eight, or any other binary fraction, or even decimal fractions, by using logic provided in a down counter. Likewise, daytime events can also be timed or split, making this invention both a night and day event timer based on the solar day and the varying times of sunrise and sunset. The solar event timer addresses safety concerns for industries that need to have a timer which is much more accurate than the 24-hour clock. An accurate event time based on the solar day is able to provide timed events at or near sunrise and/or sunset. The event time can also provide events timed from the sunrise and/or sunset reference points.

The improved accuracy of the solar day is based on the time it takes the earth to make one complete rotation referenced to the fixed stars. As mentioned, the solar period is 23 hours, 53 minutes and 4.09 seconds (23.9515 hours). Referring now to FIG. 1, using the solar period allows the solar safety event controller 10 to activate a lamp at sundown and to turn it off again at precisely one half of the dark period of time. This can be done every night of the year without being influenced by any day time clock factors or any calendar events such as daylight savings, leap years or even the varying times and weather conditions of sunrise and sunset.

This improved timer is accomplished by first loading a counter with the binary number equivalent to the solar day measured in half minutes. The solar day number is calculated to be 23.9515 hours multiplied by 60 minutes per hour, then multiplied by 2, which gives the number 2874.18 solar half minutes. The solar day measured by half minutes is then converted to a binary number 1011 0011 1010. Of course, some other division of the solar day could be used such as solar minutes, hours or seconds.

Some accuracy is lost by not being able to use the 0.18 half minutes in this preferred embodiments but it represents an overall accuracy of 99.99999373 percent. The accuracy of the line frequency is much less than this figure being only 99.83334 percent. The accuracy of the counter can be easily extended by implementing a counter that can store a value with greater accuracy. Other daylight or twilight factors can also introduce errors to the system, but the solar day counter is very accurate. Latitude has a linear effect on the length of the day in the extreme north and south locations of the earth. Darkness and daylight both happen for long periods of time depending on the season near the north and south poles. As will be seen, the length of the night produced by the latitude of the device is inherently accounted for through the counter's function.

The number 2874 half seconds is loaded into the solar down counter upon manual reset or when the down counter reaches zero. The clock rate in the clock is one half minute for daytime counting and one quarter minute for night counting. When the optical sensor coupled to the solar counter senses sundown, the count rate is doubled. Then the safety lamp is turned on and the count in the counter equals the number of solar half minutes of the dark or night part of the day. Because the clock rate is doubled, the down counter reaches zero exactly half way through the dark period. The clock accuracy is either 50 Hz or 60 Hz which is carefully controlled to plus or minus 3 cycles per hour, worldwide.

The logic circuits of this embodiment are standard implementations of the digital logic and Boolean logic industries. The unique adaptation of the logic is the use of the accurate solar day along with accurately measuring and splitting the darkness or daylight hours.

FIG. 1 illustrates a block diagram of the solar night splitter or event controller 10. The solar night splitter or event controller 10 includes a solar control unit 11, a clock timing and control unit 13, and a solar counter unit 15.

Figure 2:
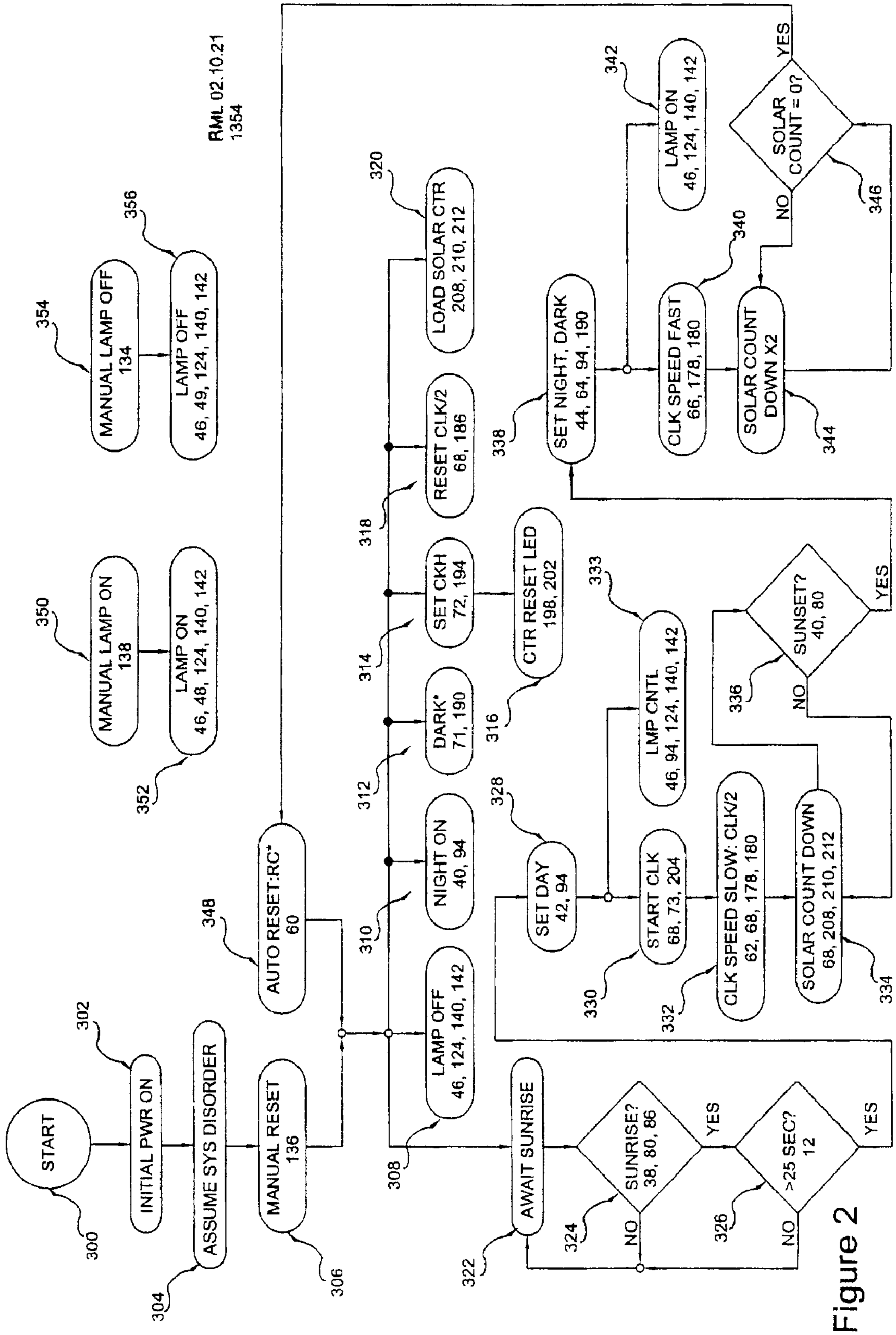
FIG. 2 is a flow chart of steps which are implemented in the hardware of the solar event timer.

Referring to the flow chart in FIG. 2, the preferred embodiment of the solar night splitter or event controller 10 can be implemented or started at night or during the daytime.

Figure 3:
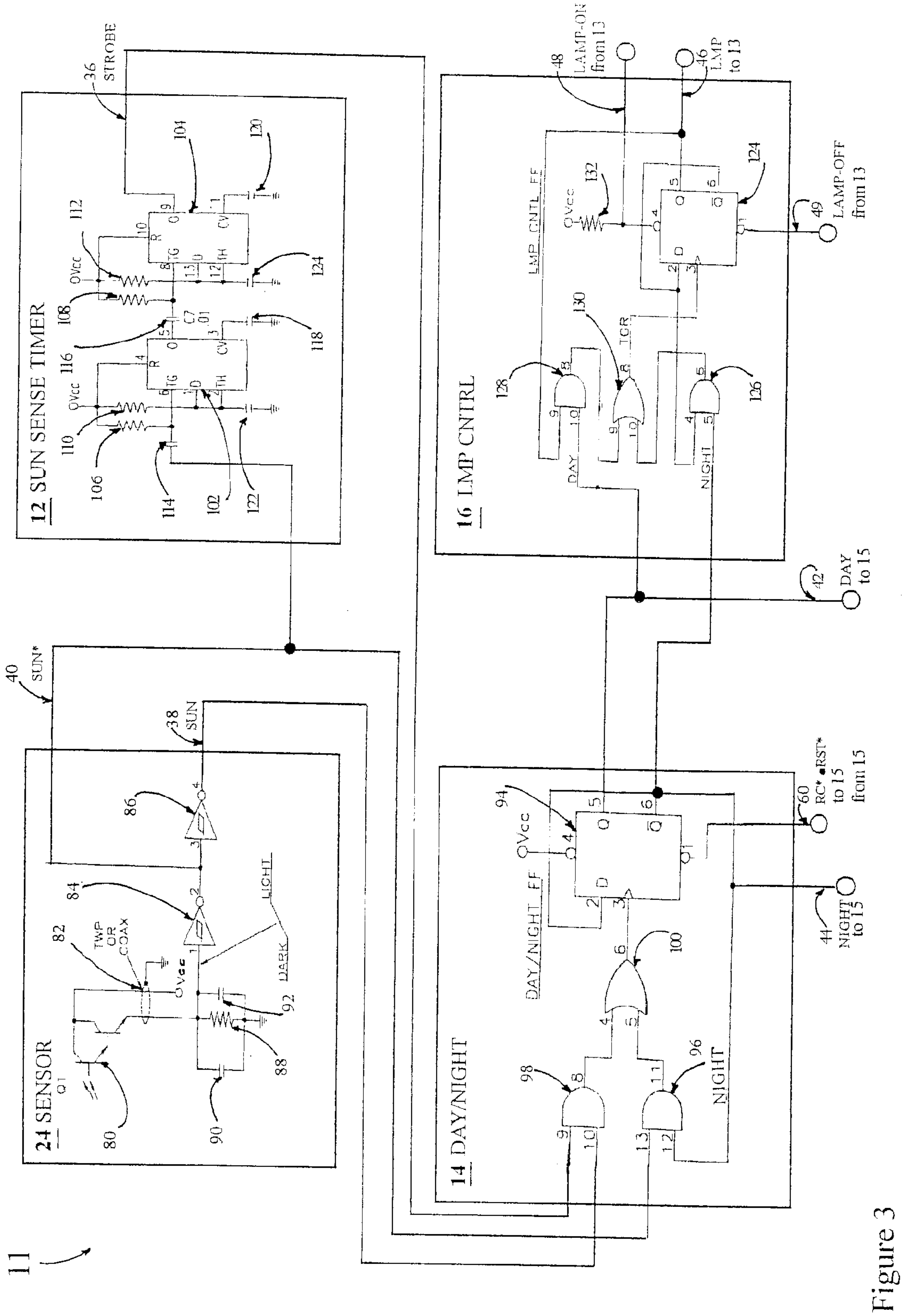
FIG. 3 is a block diagram of the solar control unit of FIG. 1, where each block contains a schematic of the electronic components in the block.
Figure 4:
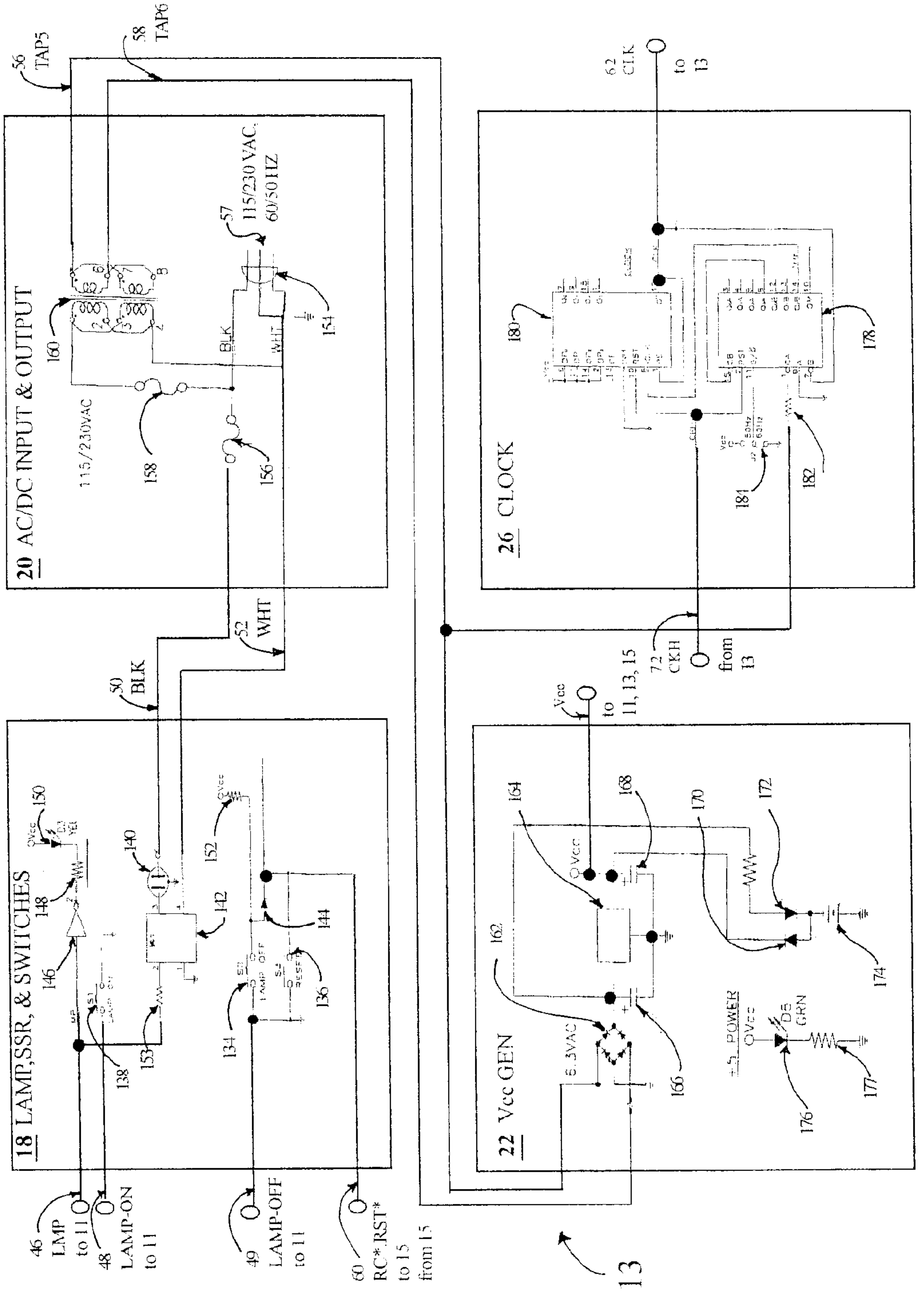
FIG. 4 is a block diagram of the clock timing and control unit of FIG. 1, where each block contains a schematic of the electronic components in the block.
Figure 5:
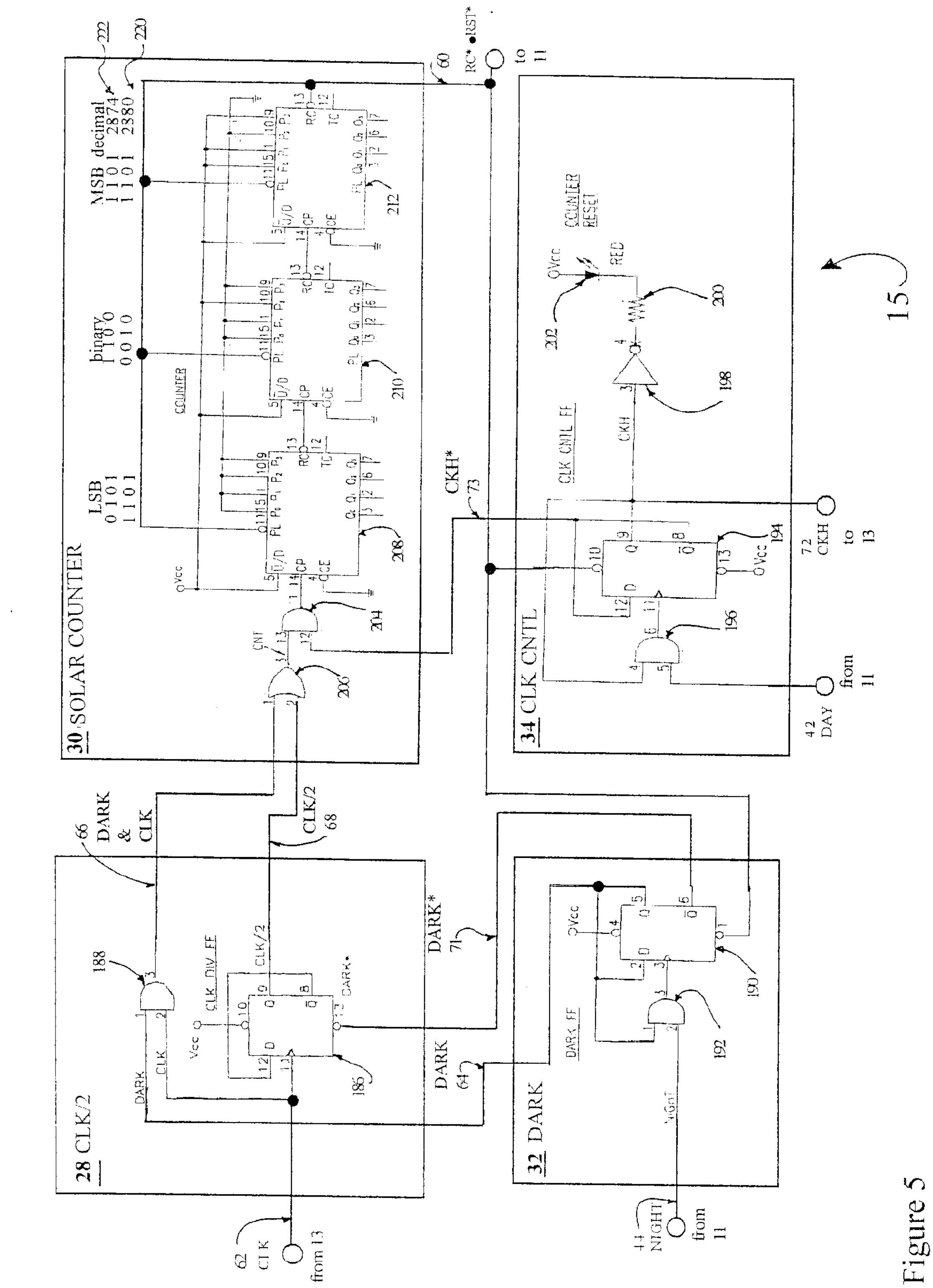
FIG. 5 is a block diagram of the solar counter unit of FIG. 1, where each block contains a schematic of the electronic components in the block.

FIG. 2 is a flow chart that summarizes the function of the solar night splitter or event controller. All but five of the numbered steps contain number references to electronic parts or elements that exist in FIGS. 3–5. As each step with numbered references is discussed, the numbered parts and their functions in FIGS. 3–5 are also pointed out. This flow chart is normally a continuous loop, but it can be reset or restarted in function 306. As shown in the flow chart with step 350, the asynchronous Lamp On Switch 138 (FIG. 4) sets the Lamp Control FF 124 (FIG. 3) to enable the SSR (solid state relay) 142 (FIG. 4) and turn on the lamp 140 (step 352). The test function 350, operates asynchronously and turns the lamp on at any time, but has no other function in the circuit. Function 354, the asynchronous Lamp Off Switch 134 (FIG. 4), resets the Lamp Control FF 124 (FIG. 3) to disable SSR 142 (FIG. 4, and turn Lamp 140 (FIG. 4) off as shown in step 356. The test function 354 operates asynchronously and turns the lamp off at any time, but has no other function in the circuit.

In FIG. 2, the test function 306 or the asynchronous Reset Switch 136 (FIG. 4) puts a zero volt or a logical signal on RC*.RST* 60 (FIGS. 3, 4, 5) which asynchronously loads the solar number 312, 220 and 222, into the solar down counter, 208, 210, 212. The asynchronous Reset Switch 136 (FIG. 4) sets the CLK CNTL FF 194 (FIG. 5) at step 314, and triggers a true signal CKH 72, which in turn resets the DARK FF (flip-flop) 190 in step 312. This sets the true signal DARK* 71 (where DARK* is the inverted DARK value), which then resets the DAY/NIGHT FF 94 (FIG. 3) in step 310, making the NIGHT signal 44 true, and finally resets the CLK/22 FF 186 (FIG. 5) in step 318, which synchronizes the clock counter. The reset of the CLK CNTL FF 194 (FIG. 5) at step 314 also sets the CTR RESET LED 202 in step 316.

The sunrise test function 324 is a test condition which checks the sensor 80 (FIG. 3) to see if daylight is present. If daylight is present, it generates a true signal on line SUN 38 (FIG. 3), through inverter 86 and a false signal on SUN* 40 through the second inverter 84.

Referring further to FIG. 2, the 25 second test function 326 is a test condition initiated by the SUN* signal 40 (FIG. 3) using a pair of one shot multi-vibrators 102, 104. If the SUN* signal 40 has a duration of more than 25 seconds, it is considered to be a true daylight condition and the signal STROBE 36 is generated at the end of the 25 second timer as a short 1 msec pulse. Otherwise, if the SUN* signal 40, is less than 25 seconds, the signal is rejected as spurious light, and the STROBE signal 36 is not generated.

The SUN signal 38 in logical AND combination with the STROBE signal 36 (FIG. 3) sets the DAY/NIGHT FFs 94 (FIG. 3) in step 328 to the daylight condition, which produces a true logic signal denoted as DAY 42. The NIGHT signal 44 is the complimentary signal on the DAY/NIGHT FF 94 which is true when a night condition exists. The DAY signal 42, and NIGHT signal 44 toggle the LMP CNTL FF 124 (FIG. 3) in step 333, which is initialized to be reset in the night mode. Should the LMP 46 be on for any reason, say a manual set, the DAY signal 42, combined with LMP 46, will reset the LMP CNTL FF 124 and set LMP 46 low, thus extinguishing the lamp 140. The signal LMP 46 is toggled to true when a sundown condition causes the NIGHT signal 44 to be true. With the LMP signal 46 is true, it causes the SSR 142 (FIG. 4) to be initialized, which causes the LAMP 140 (FIG. 4) to be turned on. The LMP CNTL FF can be controlled asynchronously as described above in steps 352, 356.

In FIG. 2 at function 330, the true DAY signal 42 (FIG. 5) toggles the CLK CNTL FF 194, from an initialized CKH 72 true signal to a CKH* 73 true signal. When the CLK CNTL FF 194 toggles, the CLOCK FF 26 (FIG. 4) stops being reset by CKH 72 and starts counting. When CKH* 73 becomes true, it allows the clock pulses to start the solar down counter 30.

The slower daylight function 332 or CLK/2 68 (FIG. 5) is allowed to clock the solar down counter. Specifically, the signal CLK 62 represents a one half minute cycle time; whereas, the signal CLK/2 68 represents a one quarter minute cycle time.

The sunset or sundown function 336 is detected by the Darlington sensor 80 (FIG. 3). This transition from daylight to darkness causes the SUN* signal 40 to toggle the DAY/NIGHT FF 94 to a NIGHT value 44 with a very narrow pulse generated with the SUN* signal 40 going high before the inverted SUN signal 38 can go low with just a gate delay for the narrow pulse. The resulting logic causes the NIGHT signal 44 to be positive or true, which toggles the DARK FF 190 (FIG. 5) which in turn sets the DARK signal 64 and the DARK* signal 71 in their active states. The step of setting the DARK signal in step 338 allows the CLK in step 340 to be the main frequency for the input of the solar down counter 344 (208, 210, 212 in FIG. 5). Since this signal counts twice as fast as the CLK/2 signal 64, the solar down counter 208, 210, 212 as in step 344 will reach zero exactly half way through the solar night or exactly between sundown and sunrise. The DARK* signal 71 asynchronously rests or disables the CLK/2 FF 186 during the whole night. The CLK signal 62 is a 1 second wide pulse with a 30 second wide period. The signal is generated by the counters 178, 180 as mentioned in step 340 (FIG. 5). The CLOCK 26 which has the timers 178,180 receives a 50/60 Hz input from TAP5, 56, which comes from transformer 160 in FIG. 4.

The functional steps 336, 338, 340, 342, described above for FIG. 2, or the transition between daylight and darkness causes the lamp 140 to be turned on after sundown. This is enabled by the SSR 142, which was enabled by the signal LMP 46 and set by the LMP CNTL FF 124, which was set by the NIGHT signal 44.

Referring now to function 344 in FIG. 2, when the solar down counter 208, 210, 212 reaches zero, the final test is completed at exactly half way between sunset and sunrise. The output of the solar down counter 208, 210, 212, is RC*.RST* 60 and this signal turns off the lamp 140 through the SSR 142, the LMP CNTL FF 124, and the DAY/NIGHT FF 94. As mentioned above, DAY/NIGHT FF 94 is asynchronously reset by either the RC*.RST* signal 60 or the reset switch 136. Accordingly, the cycle is complete and will continue by returning to function 322 in FIG. 2, unless one of the asynchronous switches is depressed. Thus, the clock is stopped and the system waits for another sunrise.

The following description describes each of the parts in each block of FIGS. 3–5 in the drawings. The Sensor block 24 of FIG. 3 will now be described. There is a Darlington photo transistor sensor 80, and a remote cable made of either a twisted pair (TWP) or coaxial cable 82 to carry the signal from the photo transistor to the sensor logic. The sensor logic is coupled to the remote cable and includes two Schmitt logic invertors 84, 86, a resistor 88, and two capacitors 90, 92. Actual sunlight or daylight that is measured by the photo sensor is the input to this block. The output from this block is boolean logic values SUN 38, and SUN* 40 (where SUN* is the inverted SUN value).

The Sun Sense Timer block 12 of FIG. 3 will now be discussed. The sun timer includes two timers (connected as a one shot flip flop) 102, 104. The timer also includes four resistors 106, 108 and four capacitors 114, 116, 118, 120. A larger value capacitor 122, a smaller value capacitor 124 are also included. The input to this block is SUN* 40. The output to this block is STROBE 36.

Referring now to FIG. 3, the Day/Night 14 block includes a flip-flop 94, two AND logic gates 96, 98, and an OR gate 100. The inputs to this block are STROBE 36, SUN 38, SUN 40* and RC*.RST 60. The outputs of this block are DAY 42, and NIGHT 44. The lamp control block 16 includes a flip flop 124, two AND gates 126, 128, or OR gate 130, and resistor 132. The input signals to this block are DAY 42, NIGHT 44 and LAMP-ON 48 and LAMP-OFF 49. The output is LMP 46.

Referring to FIG. 4, the Lamp, SSR, and Switches block 18 includes an open-collector logic inverter 146, a resistor 148, and a LED (yellow, Lamp-on indicator) 150. Also included are a resistor 152, three contact switches (lamp-off, lamp-on, reset) 134, 138, 138; and a diode 144. The lamp circuit also has a solid state relay 142, one lamp connection 140, and one resistor 153. The inputs to this block are AC Power BLK 50 and WHT 52, and LMP 46. The outputs are LAMP-ON 48, RC*.RST*60; and LAMP-OFF 49.

The AC/DC Input and Output block 20 of FIG. 4 delivers transformed AC power at preferably 50–60 HZ to the AC components of the system. The power block includes an AC power plug 154, and two fuses 156, 158. A transformer 160 is used to convert the 115VAC/220VAC line voltage at 60 Hz/50 Hz 57 to an output which is 6.3VAC, 50/60 Hz on TAP5 56 and TAP6 58. The transformer also provides power to the lamp connectionl 40. A separate power unit is used to provide power to the electronic logic and chips of the system. The Vcc GEN 22 produces the necessary power for the integrated circuits and other components. The Vcc GEN includes a bridge diode network 162, a 5VDC rectifier 164, a first capacitor 166, and a second capacitor 168 to rectify the incoming AC signal. The voltage generation unit also includes a battery and battery charging sub-system including two diodes 170, 172, a 4.8VDC battery 174, a LED (green, +5V) 176, and a resistor 177. The input to this block is 6.3VAC 50/60/Hz from TAP5 56 and TAP6 58.

The Clock unit of FIG. 4 includes a divide by 50/60 counter 178, a divide by 15 counter 180, a resistor 182, and ajumper 184. The input to this block is the 6.3VAC 50/60 Hz from TAP5 56. The output of the clock is CLK 62.

Referring to FIG. 5, the second clock unit CLK/2 28, includes a D FF (flip-flop) 186, and an AND gate 188. The input signals on this block are DARK 64, DARK *71, and CLK 62. The outputs are DARK+CLK 66, and CLK/2 68. The unit Dark 32 includes a D FF (flip-flop) 190; and an AND gate 192. The inputs to this block are NIGHT 44, and RC*.RST*60. The outputs are DARK 64, and DARK* 71.

The block Clk Cntl 34 has a D FF (flip-flop) 194, an AND gate 196, and an open collector inverter 198. This block also includes a resistor 200 and an LED (red Reset) 202. The inputs to this block are DAY 42, RC*.RST* 60, and the outputs are CKH 72 and CKH* 73.

The Solar Counter block 30 has an AND gate 204, an OR gate 206, and three up/down counters, 208,210, 212. The inputs to the Solar Counter are CLK/2 68, DARK+CLK 66, CKH* 73; and RC*.RST* 60. The output is RC*.RST* 60. This down counter can be hard wired to parallel load the decimal number 2880 or binary number 101101000000 (numbered from right to left on the down counters) 220.

Variations of the Embodiment

The individual circuit components used in this invention are not unique and can be purchased off the shelf and configured by those skilled in the art of electronic circuitry. It should also be noted that the circuit is not the limiting feature of this concept. Many of the circuits or logic in this invention are simply D flip flops configured to be toggle flip flops. Basic courses in digital logic teach that toggle flip flops can be made from D, S-R, J-K and T flip flops, as well as from discrete logic gates or discrete transistor, diode, resistor, and capacitor circuits. The counters, timers, and other integrated circuits also have numerous counter parts from which a circuit such as this could be made.

One embodiment of this concept has a battery backup circuit but no provision for substitute 50/60 Hz clock input frequency in the case of AC power loss. However, many such circuits already exist and it would be easy to include such a circuit in this invention, but even such a circuit would not improve the accuracy of the invention. Another more expensive implementation of this concept would be to delete the battery backup portion of the circuit, and plug the rest of the circuit into a Uninterruptible Power Supply (UPS). Using a UPS replaces the deleted battery backup circuits, and provides a frequency source input at the same time. Very little accuracy would be lost using this alternative embodiment. It should also be noted that two or more solar event counters could be used in combination with certain electro-mechanical events that need to be triggered.

Another implementation of this circuit would be to make it both a day event timer as well as a night event timer, as mentioned above. Only a few logic gates or shift registers need be provided. It should be noted that the number loaded into the down counter can be either solar or sidereal, or any other accurate measurement that is useful.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A solar event timer, comprising:

a) an optical sensor to determine when daylight begins and ends;

b) a solar counter loaded with a number of solar units in a day;

c) a clock, coupled to the solar counter and optical sensor, configured to linearly count down solar units during daylight and to count down the solar units at night at an accelerated rate; and d) electronic circuitry, coupled to the solar counter, configured to trigger an event when the solar counter reaches zero.

2. A solar event timer as in claim 1, wherein the solar unit is selected from the group consisting of solar half minutes, solar minutes, solar hours, or solar seconds.

3. A solar event timer as in claim 1, wherein the event triggered is a light turning off.

4. A solar event timer as in claim 1, further comprising a delay circuit coupled to the optical sensor configured to determine whether detected light is actual daylight or spurious light.

5. A solar event timer as in claim 1, wherein a light is turned on when daylight ends and then the light is turned off when the solar counter reaches zero.

6. A solar event timer as in claim 1, further comprising a battery back-up circuit configured to provide power.

7. A solar event timer as in claim 1, further comprising a substitute 50/60 Hz clock input frequency to provide power in the case of an AC power loss.

8. A method for using a solar counter to split a day into exact portions, comprising the steps of:

a) loading the solar counter with a number of solar half minutes in a day, wherein the number of solar half minutes is loaded at the beginning of a solar cycle;

b) reducing the count of the electronic counter by one for each solar half minutes during the daytime;

c) testing continuously with an optical sensor to determine when night begins;

d) reducing the count of the electronic counter by a factor greater than 1 for each solar half minute during the night; and e) triggering an event when the electronic counter reaches zero.

9. A method as in claim 8, wherein step (e) further comprises triggering an event that is an electro-mechanically powered event.

10. A method as in claim 8, wherein step (d) further comprises the steps of turning a light on when the optical sensor determines a beginning of the night.

11. A method as in claim 10, wherein step (e) further comprises triggering an event that turns a light off when the electronic counter reaches zero.

12. A method as in claim 8, wherein step (e) further comprises reducing the count of the electronic counter by a factor of 2 for each solar half minute during the night to split the night in half and enable the triggering of an event exactly half way through the night.

13. A method as in claim 8, wherein step (e) further comprises reducing the count of the electronic counter by a factor of at least 2 for each solar half minute during the night to split the night in half and enable the triggering of an event in the night.

14. A method for using an accurate counter to split a night into selected portions, comprising the steps of:

a) dividing a full day into a number of solar half minutes;

b) loading an electronic counter at sunrise with the number of solar half minutes;

c) reducing the count of the electronic counter by one for each solar half minute during daylight;

d) testing continually with an optical sensor to determine when night begins;

e) reducing the count of the electronic counter by a factor greater than 1 for each solar half minute during the night; and f) triggering an event when the electronic counter reaches zero.

15. A method as in claim 14 wherein step (f) further comprises triggering an event that turns a light on when the electronic counter reaches zero.

16. A method as in claim 14 wherein step (d) further comprises the step of turning a light on when the optical sensor determines a beginning of the night.

17. A method as in claim 16 wherein step (f) further comprises triggering an event that turns a light off when the electronic counter reaches zero.

18. A method as in claim 16 wherein step (e) further comprises reducing the count of the electronic counter by a factor of 2 for each solar half minute during the night in order to split the night in half and enable the triggering of an event exactly half way through the night.

19. A method as in claim 14 wherein step (e) further comprises reducing the count of the electronic counter by a factor greater than 2 for each solar minute during the night to enable the triggering of an event a selected time interval after sunset.

* * * * *